United States Patent
Gonschor

(10) Patent No.: US 7,045,984 B2
(45) Date of Patent: May 16, 2006

(54) METHOD AND APPARATUS FOR ADJUSTMENT AND AUTOMATIC READJUSTMENT OF THE LAMP IN A MICROSCOPE

(75) Inventor: Matthias Gonschor, Gleichen (DE)

(73) Assignee: Carl Zeiss Jena GmbH, Jena (DE)

( * ) Notice: Subject to any disclaimer, the term of this patent is extended or adjusted under 35 U.S.C. 154(b) by 21 days.

(21) Appl. No.: 10/949,587

(22) Filed: Sep. 24, 2004

(65) Prior Publication Data
US 2005/0127270 A1 Jun. 16, 2005

(30) Foreign Application Priority Data
Sep. 26, 2003 (DE) ............................... 103 45 367

(51) Int. Cl.
G05B 5/00 (2006.01)
H02H 7/08 (2006.01)
H02P 1/04 (2006.01)
H02P 3/00 (2006.01)
H02P 7/00 (2006.01)

(52) U.S. Cl. ...................... 318/480; 362/271; 362/324; 362/268; 362/269; 362/270; 362/319

(58) Field of Classification Search ................ 318/480; 362/268, 270, 271, 272, 319, 324, 575
See application file for complete search history.

(56) References Cited

U.S. PATENT DOCUMENTS

| 4,737,022 A * | 4/1988 | Faltermeier et al. ......... 359/387 |
| 2003/0015643 A1* | 1/2003 | Veith et al. ................. 250/205 |
| 2003/0015978 A1* | 1/2003 | Sulik .......................... 318/140 |

* cited by examiner

Primary Examiner—David Martin
Assistant Examiner—Erick Glass
(74) Attorney, Agent, or Firm—Reed Smith LLP

(57) ABSTRACT

Method and apparatus for the adjustment and automatic readjustment of the lamp in a microscope. The present invention is used for adjusting the lamp in a microscope. In the solution according to the invention, the tilting direction of the glass body relative to the lamp cap is marked at the lamp. The lamp cap is likewise marked for oriented insertion of the marked lamp so that the tilting direction of the lamp lies in direction of the optical axis of the collector after insertion. For adjusting, the collector-reflector unit is displaced in direction of the optical axis of the collector and the lamp cap is then oriented in vertical direction of the optical axis of the collector. For automatic readjustment, the lamp cap has an actuating drive. A reference variable is determined for the actuating drive by a control unit by evaluating lamp voltage or lamp current. The proposed solution can be applied in all devices in which an ultra-high pressure gas discharge lamp is to be moved into and/or maintained in a focus position.

10 Claims, 2 Drawing Sheets

METHOD AND APPARATUS FOR ADJUSTMENT AND AUTOMATIC READJUSTMENT OF THE LAMP IN A MICROSCOPE

CROSS-REFERENCE TO RELATED APPLICATION

This application claims priority of German Application No. 103 45 367.9, filed Sep. 26, 2003, the complete disclosure of which is hereby incorporated by reference.

BACKGROUND OF THE INVENTION a) Field of the Invention

The present invention is directed to an apparatus and associated method for the adjustment of the lamp in a microscope. The lamp is to be brought into the focal plane and oriented therein corresponding to the optical axis.

b) Description of the Related Art

In fluorescence microscopy and light microscopy, ultra-high pressure gas discharge lamps, for example, ultra-high pressure xenon or mercury gas discharge lamps, are used as excitation light sources and illumination light sources and are to be positioned in the beam path in a corresponding manner. In order to make better use of the light flux radiated by the lamp, there is an additional reflector mirror which projects the image of the light arc as exactly as possible in the plane of the light arc. There are essentially two disadvantages to the use of such lamps.

For one, the lamps that are used are subject to wear which expresses itself with increasing lighting hours in an increased electrode gap due to erosion. As a result, the intensity centroid of the illumination light moves out of the focus position in the optical axis so that the homogeneity of the illumination field worsens in addition. In order to compensate for this movement, a manual height adjustment is usually found in the illumination device.

The other disadvantage consists in that the gas discharge lamps that are used have large mechanical tolerances due to their method of manufacture. These tolerances express themselves, for example, in a different electrode spacing from the base or cap or from an axial run-out at which the glass body sits obliquely on the lamp foot.

For these reasons, an exact adjustment of the lamp, and possibly of the reflector mirror, with respect to the optical axis of the collector is necessary every time a lamp is changed.

The prior art discloses arrangements in which the lamp can be adjusted in the focal plane of the collector and reflector mirror can be adjusted in a plane parallel to the focal plane and along the optical axis.

Further, arrangements are known in which the reflector mirror is fixedly connected to the lamp housing so that only the lamp can still be adjusted in the focal plane of the collector and in direction of the optical axis of the collector. In both cases, it is possible, in addition, to focus the collector.

However, the arrangements mentioned above have the disadvantage that the sequence of adjustment steps to be carried out is very complex due to the many degrees of freedom and these adjustment steps require a certain basic knowledge of adjustment in order to achieve optimal adjustments.

OBJECT AND SUMMARY OF THE INVENTION

It is the primary object of the present invention to develop a solution by which it is possible for the user to adjust the lamp with the fewest possible degrees of freedom and without a basic knowledge of adjustment when assembling the light and also during its operation.

According to the invention, this object is met in an apparatus for the adjustment of the lamp in a microscope, comprising a collector and a reflector which form a mechanical unit, a lamp cap which is arranged between the collector and reflector for receiving the lamp and devices for the adjustment of the lamp and of the collector-reflector unit. The lamp has a mark of the tilting direction of its glass body relative to the lamp cap. The lamp cap has a mark for the oriented insertion of the marked lamp so that the tilting direction of the lamp lies in direction of the optical axis of the collector after insertion. The collector-reflector unit is displaceable for adjusting in direction of the optical axis. The lamp cap is displaceable for adjustment in a vertical direction.

The apparatus for the adjustment and automatic readjustment of the lamp in a microscope comprises a collector and a reflector which form a mechanical unit, a lamp cap which is arranged between the collector and reflector for receiving the lamp, and devices for the adjustment of the lamp and of the collector-reflector unit. According to the method, the tilting direction of the glass body relative to the lamp foot is determined and marked at the lamp. In order to make it possible to insert the lamp in an oriented manner, the lamp cap likewise has a mark so that the tilting direction of the lamp lies in direction of the optical axis of the collector after insertion.

For the purpose of adjustment, the collector-reflector unit is displaced in direction of the optical axis of the collector in order to orient the light arc generated between the electrodes of the lamp in the focal plane of the collector and subsequently, by displacing the lamp cap in vertical direction, on the optical axis of the collector.

For the purpose of readjustment during operation, a reference variable is determined for an actuating drive provided at the lamp cap by a control unit by evaluating the lamp voltage or lamp current and a corresponding control signal is sent to this actuating drive.

The proposed solution can be applied in all devices in which an existing ultra-high pressure gas discharge lamp must be moved into and/or held in a focus position.

The invention will be described more fully in the following with reference to embodiment examples.

DESCRIPTION OF THE PREFERRED EMBODIMENTS

Figure 1:
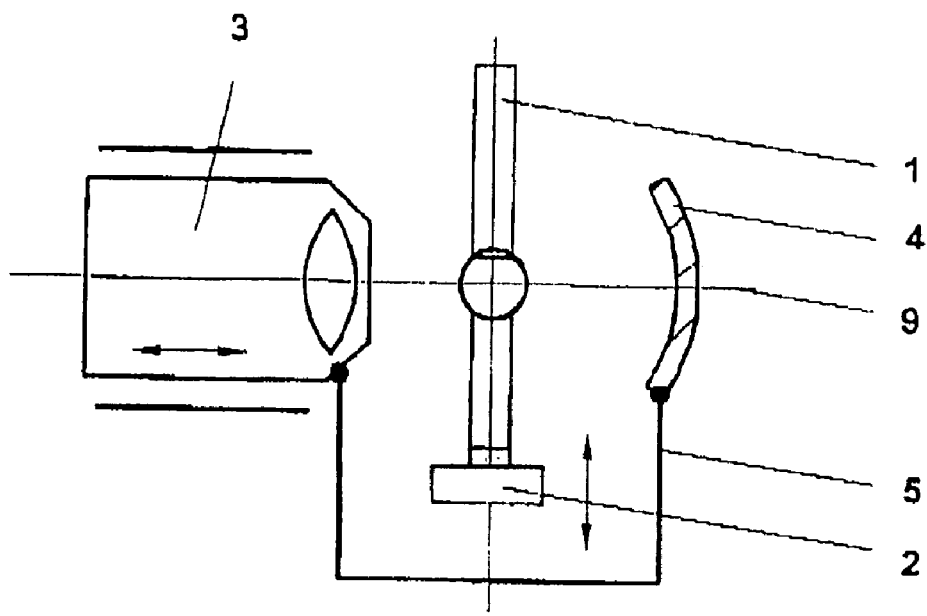
FIG. 1 shows a basic arrangement for lamp focusing and collector focusing in a microscope.

In the method and the apparatus, according to the invention, for the adjustment and automatic readjustment of the lamp in a microscope, the apparatus according to FIG. 1 comprises a lamp cap 2 which receives the lamp 1 and which is arranged between a collector 3 and a reflector 4 which form a mechanical unit 5. The collector-reflector unit 5 and the lamp cap 2 have devices for adjustment. The optical axis 9 of the collector 2 coincides with that of the reflector 4.

Figure 2:
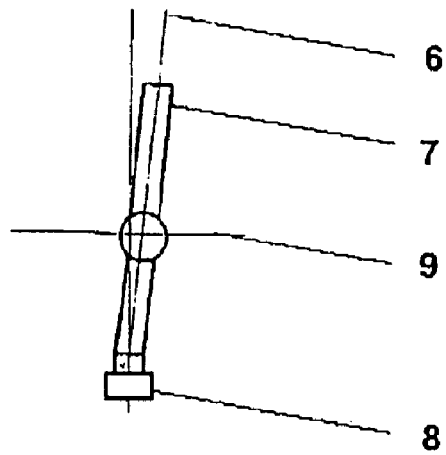
FIG. 2 shows a lamp having axial run-out.
Figure 3:
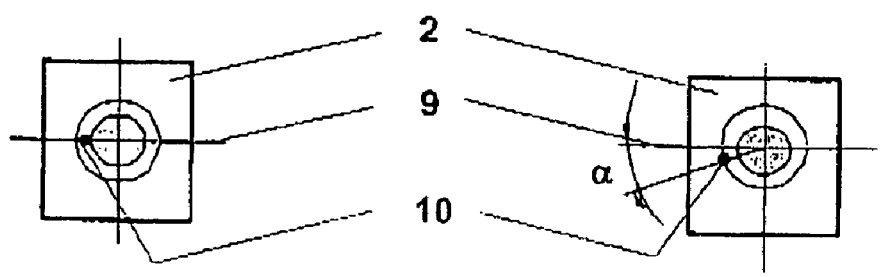
FIG. 3 shows marked lamp mounts for oriented insertion of marked lamps.

According to the method, the tilting direction 6 of the glass body 7 is determined relative to the lamp foot 8 and is marked at the lamp 1, preferably at the lamp foot 8. FIG. 2 shows a lamp 1 having an axial run-out. For oriented insertion of the marked lamp 1, the lamp cap 2 likewise has a mark 10 so that the tilting direction 6 of the lamp 1 lies in direction of the optical axis 9 of the collector 3 after insertion. FIG. 3 shows two marked lamp mounts.

In order to adjust, the collector-reflector unit 5 is displaced in direction of the optical axis 9 of the collector 3 so as to orient the light arc generated between the electrodes of the lamp 1 in the focal plane of the collector 3 and subsequently, by displacing the lamp cap 2 in vertical direction, on the optical axis 9 of the collector 3.

As a result of this oriented insertion of the marked lamp 1 and a focusing of the collector-reflector unit 5, a sharp imaging of the light arc and its mirror image in a plane, namely, the focal plane of the collector, is always simultaneously achieved regardless of the tilting angle and tilting direction of the lamp 1.

The center of curvature of the reflector 4 lies in the focal plane of the collector 3. This arrangement ensures that the mirror image of the light arc generated between the electrodes of the lamp 1 is imaged with optimal adjustment in the plane of the light arc 1, i.e., in the focal plane of the collector 3.

Figure 4:
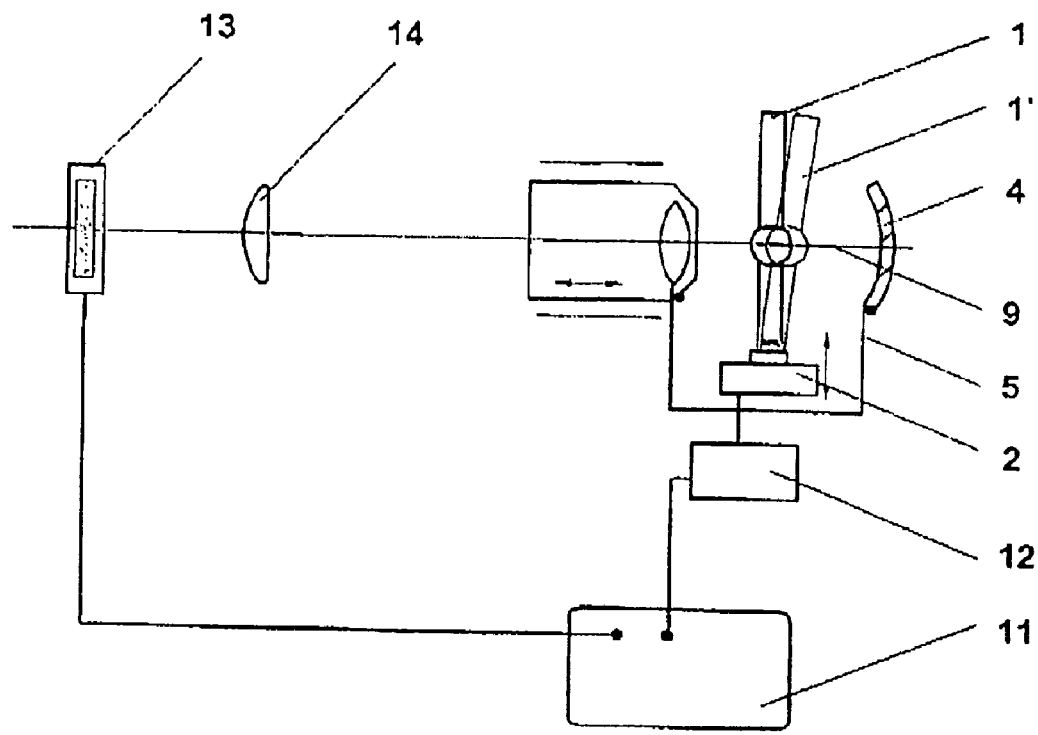
FIG. 4 shows an arrangement for the adjustment and automatic readjustment of the lamp.
Figure 5:
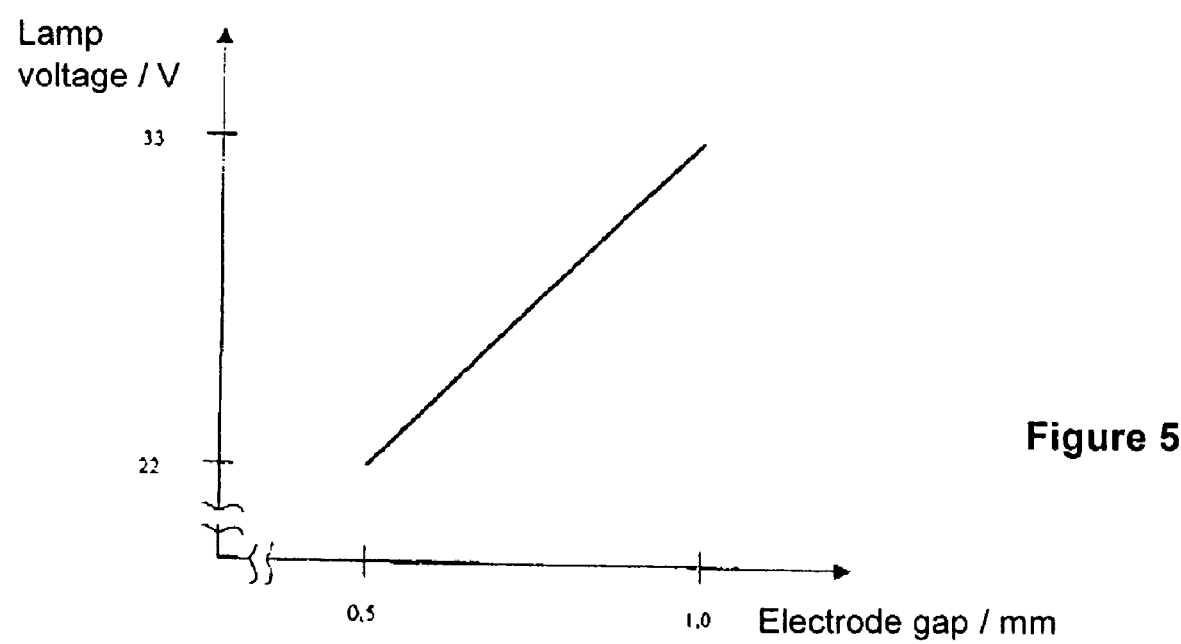
FIG. 5 shows a graph depicting the curve of the lamp voltage as a function of the electrode gap.

A possible arrangement for the adjustment and automatic readjustment of the lamp is shown in FIG. 4. This arrangement comprises a lamp cap 2 which receives the lamp 1 and which is arranged between a collector 3 and reflector 4, which latter form a mechanical unit 5. A lamp 1' having an axial run-out is illustrated in FIG. 2 in addition. Both the collector-reflector unit 5 and the lamp cap 2 have devices for adjustment.

For readjustment during operation, a reference variable for an actuating drive provided at the lamp cap 2 is determined by a control unit 11 by evaluation of the lamp voltage 12 or lamp current, and a corresponding control signal is sent to this actuating drive. This is possible because the lamp voltage applied by the electrodes increases with increasing lighting hours of the lamp 1 due to the continuous erosion of the electrodes. The dependence of the lamp voltage on the electrode gap is illustrated in a graph in FIG. 6.

In an advantageous construction, an evaluation of the illumination profile can be carried out by measuring devices 13 which are provided and output devices can indicate when an optimal adjustment has been achieved. The measuring device 13 measures the illumination profile in an axis perpendicular to the optical axis 9 of the collector 3. For example, a CCD-line camera with imaging optics 14 arranged in front of it can be used as a measuring device 13.

It is also possible that the collector-reflector unit 5 and the lamp cap 2 can both have actuating drives for motor-actuated adjustment, and a reference variable for the actuating drives can be determined by an existing control unit 11 by evaluating the illumination profile and a corresponding control signal can be sent to these actuating drives.

For certain applications, it is desirable to generate the largest possible illuminating surface. For this purpose, the lamp 1, which must have an axial run-out for this purpose, must be adjusted in such a way that the light arc and its mirror image lie directly side by side in the same plane. This can be achieved by another advantageous construction. For this purpose, the tilting direction of the glass body 7 relative to the lamp foot 8 is marked at the lamp 1 in the manner described above. However, the mark on the lamp cap 2 for oriented insertion of the marked lamp 1 is carried out in such a way that the tilting direction of the lamp 1 lies at an angle $\alpha$ to the direction of the optical axis 9 of the collector 3 after insertion. In this respect, reference is had to the illustration on the right-hand side of FIG. 3. The angle $\alpha$ is dependent upon the size of the tilting angle of the lamp 1 and can be up to 10°, preferably 1°–2°.

With the apparatus according to the invention, the degrees of freedom of adjustment are reduced in that the collector and mirror are constructed as a unit. The proposed solution also makes it possible to image the light arc and its mirror image in a plane in such a way that they either coincide so as to achieve a high luminance or are imaged next to one another in order to achieve a larger illuminating surface.

Through the use of the lamp voltage or lamp current as reference variable for the automatic readjustment of the lamp, it can be ensured that the lamp need no longer be adjusted by the user over its entire lifetime.

While the foregoing description and drawings represent the present invention, it will be obvious to those skilled in the art that various changes may be made therein without departing from the true spirit and scope of the present invention.

What is claimed is:

1. Apparatus for the adjustment of the lamp in a microscope, comprising:
    a collector and a reflector which form a mechanical unit;
    a lamp cap which is arranged between the collector and reflector for receiving the lamp; and
    devices for the adjustment of the lamp and of the collector-reflector unit;
    said lamp having a mark of the tilting direction of its glass body relative to the lamp cap;
    said lamp cap having a mark for the oriented insertion of the marked lamp so that the tilting direction of the lamp lies in direction of the optical axis of the collector after insertion;
    said collector-reflector unit being displaceable for adjusting in direction of the optical axis; and
    said lamp cap being displaceable for adjustment in a vertical direction.

2. The apparatus for adjustment according to claim 1, wherein an evaluation of the illumination profile is carried out by measurement device and output devices can indicate when the optimal adjustment has been achieved.

3. The apparatus for adjustment according to claim 1, wherein the collector-reflector unit and the lamp cap have actuating drives for motor-actuated adjustment and a control unit is provided which determines a reference variable for the actuating drives by evaluating the measured illumination profile and sends a corresponding control signal to these actuating drives.

4. The apparatus for adjustment according to claim 1, wherein the lamp has a mark of the tilting direction of its glass body relative to the lamp cap, the lamp cap has a mark for the oriented insertion of the marked lamp so that the tilting direction of the lamp lies at an angle α to the direction of the optical axis of the collector after insertion, this angle α being up to 10°.

5. The apparatus for automatic readjustment according to claim 1, wherein the lamp cap has an actuating drive for readjustment during operation and a control unit determines a reference variable for the actuating drive by evaluating lamp voltage or lamp current and sends a corresponding control signal to this actuating drive.

6. A method for the adjustment of the lamp in a microscope, wherein a lamp cap receiving the lamp is arranged between a collector and a reflector which form a mechanical unit, and the lamp cap and collector-reflector unit have devices for adjustment, wherein the tilting direction of the glass body relative to the lamp cap is marked at the lamp, the lamp cap is likewise marked for oriented insertion of the marked lamp so that the tilting direction of the lamp lies in direction of the optical axis of the collector after insertion, the lamp cap is displaced in direction of the optical axis of the collector for adjusting the collector-reflector unit in order to orient the light arc generated between the electrodes of the lamp in the focal plane of the collector and subsequently, by displacing the lamp cap in vertical direction, on the optical axis of the collector.

7. The method for adjusting the lamp according to claim 6, wherein an evaluation of the illumination profile is carried out by the provided measuring device and output devices can indicate when the optimal adjustment has been achieved.

8. The method for adjustment of the lamp according to claim 6, wherein the collector-reflector unit and the lamp cap both have actuating drives for motor-actuated adjustment and a control unit is provided which determines a reference variable for the actuating drives by evaluating the measured illumination profile and sends a corresponding control signal to these actuating drives.

9. An apparatus for adjustment according to claim 1, wherein the tilting direction of its glass body relative to the lamp cap is marked on the lamp, and the lamp cap is likewise marked for oriented insertion of the marked lamp so that the tilting direction of the lamp lies at an angle α to the direction of the optical axis of the collector after insertion, said angle α being up to 10°.

10. The method for automatic readjustment of the lamp according to claim 6, wherein for purposes of readjustment during operation a control unit determines a reference variable for an actuating drive provided at the lamp cap by evaluating lamp voltage or lamp current and sends a corresponding control signal to this actuating drive.

* * * * *